US006823382B2

(12) United States Patent
Stone (10) Patent No.: US 6,823,382 B2
(45) Date of Patent: Nov. 23, 2004

(54) MONITORING AND CONTROL ENGINE FOR MULTI-TIERED SERVICE-LEVEL MANAGEMENT OF DISTRIBUTED WEB-APPLICATION SERVERS

(75) Inventor: Bradley A. Stone, Palo Alto, CA (US)

(73) Assignee: Altaworks Corporation, Nashua, NH (US)

( * ) Notice: Subject to any disclaimer, the term of this patent is extended or adjusted under 35 U.S.C. 154(b) by 606 days.

(21) Appl. No.: 09/682,324

(22) Filed: Aug. 20, 2001

(65) Prior Publication Data

US 2003/0036886 A1 Feb. 20, 2003

(51) Int. Cl.[7] .............................................. G06F 11/30
(52) U.S. Cl. ...................... 709/224; 709/202; 709/223
(58) Field of Search ................................ 709/202, 224, 709/223

(56) References Cited

U.S. PATENT DOCUMENTS

| | | | |
|---|---|---|---|
| 5,390,243 A | 2/1995 | Casselman et al. | 379/266.08 |
| 5,504,894 A | 4/1996 | Ferguson et al. | 707/2 |
| 5,572,674 A | 11/1996 | Ernst | 709/221 |
| 5,598,532 A | 1/1997 | Liron | 703/2 |
| 5,694,548 A | 12/1997 | Baugher et al. | 709/227 |
| 5,799,173 A | 8/1998 | Gossler et al. | 703/21 |
| 5,819,045 A | 10/1998 | Raman et al. | 709/226 |
| 5,898,668 A | 4/1999 | Shaffer | 370/230 |
| 5,958,009 A | 9/1999 | Friedrich et al. | 709/224 |
| 5,964,891 A | 10/1999 | Caswell et al. | 714/31 |
| 6,067,545 A | 5/2000 | Wolff | 707/10 |
| 6,085,243 A * | 7/2000 | Fletcher et al. | 709/224 |
| 6,108,700 A | 8/2000 | Maccabee et al. | 709/224 |
| 6,141,686 A | 10/2000 | Jackowki et al. | 709/224 |
| 6,144,996 A | 11/2000 | Starnes et al. | 709/217 |
| 6,151,688 A | 11/2000 | Wipfel et al. | 714/48 |
| 6,157,955 A | 12/2000 | Narad et al. | 709/228 |
| 6,173,306 B1 | 1/2001 | Raz et al. | 718/102 |
| 6,212,562 B1 | 4/2001 | Huang | 709/227 |
| 6,226,377 B1 | 5/2001 | Donaghue, Jr. | 379/265.13 |
| 6,243,396 B1 * | 6/2001 | Somers | 370/469 |
| 6,349,325 B1 * | 2/2002 | Newcombe et al. | 709/202 |
| 6,397,359 B1 * | 5/2002 | Chandra et al. | 714/712 |
| 6,681,232 B1 * | 1/2004 | Sistanizadeh et al. | 707/104.1 |
| 6,701,342 B1 * | 3/2004 | Bartz et al. | 709/200 |
| 6,718,358 B1 * | 4/2004 | Bigus et al. | 718/100 |
| 6,734,878 B1 * | 5/2004 | DeLuca et al. | 345/735 |
| 6,748,416 B2 * | 6/2004 | Carpenter et al. | 709/202 |

OTHER PUBLICATIONS

S. Frolund et al.; Solomon: Monitoring End–User Service Levels; Proceedings of the Sixth IFIP/IEEE International Symposium on Integrated Network Management, 1999; pp. 261–274; May 1999.*

Krunoslav Trzec et al.; Intelligent Agents for QoS Management; Proceedings of the First International Joint Conference on Autonomous Agents and Multiagent Systems; pp. 1405–1412; Jul. 2002.*

* cited by examiner

Primary Examiner—Kenneth R. Coulter
(74) Attorney, Agent, or Firm—Davis & Bujold, P.L.L.C.

(57) ABSTRACT

A web site provides services to uses over the Internet. End-user service-level objectives (SLOs) such as availability and performance are measured and reported to a SLO agent. User requests pass through several tiers at the web site, such as a firewall tier, a web-server tier, an application-server tier, and a database-server tier. Each tier has several redundant service components that can process requests for that tier. Local agents, operating with any local resource managers, monitor running service components and report to a service agent. Node monitors also monitor network-node status and report to the service agent. When a node or service component fails, the service agent attempts to restart it using the local agent, or replicates the service component to other nodes. When the SLO agent determines that a SLO is not being met, it instructs the service agent to replicate more of the constraining service components or increase resources.

20 Claims, 10 Drawing Sheets

MONITORING AND CONTROL ENGINE FOR MULTI-TIERED SERVICE-LEVEL MANAGEMENT OF DISTRIBUTED WEB-APPLICATION SERVERS

BACKGROUND OF INVENTION

This invention relates to distributed computer systems, and more particularly to performance monitoring and control of server computers and applications.

Multi-tasking computer systems have existed for several decades, allowing a computer resource to be shared among many users. A computing resource, such as use of the central processing unit (CPU), is shared among different programs or processes running for different users.

Management of these concurrent processes was provided by simple UNIX commands. A UNIX process could be commanded to be nice, allowing other processes to have a higher priority and use a greater percentage of the CPU time. However, since a high-level user application could spawn many processes, determining which processes belonged to each user application was difficult.

Other performance-monitoring tools were developed, such as Hewlett-Packard's PerfView monitor. Monitoring data for the different processes belonging to an application could be aggregated, allowing performance of a higher-level application to be monitored rather than the separate processes it spawned.

More advanced resource-manager tools such as Hewlett-Packard's Process Resource Manager (PRM) have become available. Computing resources such as the target percentage of the CPU, main memory, or I/O channels could be allocated among applications.

While these resource-based measurements are still commonly used, the end user is more concerned with other metrics. The user cares more about when his job will be finished, or how long a web site takes to respond, than the exact percentage of a remoter server that he is allocated. Indeed, Internet users may not be upset if only allocated 1% of a server's CPU, but may complain when a server's response takes 2 minutes.

Metrics such as response time, job time, or availability are known as service-level measurements. Targets such as a database-application response time of less than 5%, or a server availability of greater than 99.95%, are known as service-level objectives (SLO's). These objectives are defined in terms of the end-user service experience, rather than resource usage.

Monitoring products that measure against such service-level objectives are being developed, such as Hewlett-Packard's Web Transaction Observer. However, when such SLO's are not met, the burden is on the network administrator to determine what changes to make to meet the SLO's. The administrator may have to reduce CPU usage of other lower-priority applications to improve the SLO of a failing application. However, this may cause the SLO of other applications to fall below targets.

Additionally, the SLO's may not be met due to other factors, such as load balancing among a cluster of servers at a server farm. The SLO may depend on several layers of applications, any of which could be causing the SLO to miss. Complex multi-level e-commerce applications may include database back-ends and front-end server applications, as well as middleware layers of software. These software components may be distributed across several machines, or may reside on shared machines. The many interconnected components that together provide a service to an end user may even share the same CPUs, requiring that CPU usage be intelligently allocated among them all to maximize the service-level objective.

Determining system-management policies to maximize SLO's is quite difficult. A system that can monitor overall SLO's and adjust the lower-level resource allocations is desirable.

DETAILED DESCRIPTION

The present invention relates to an improvement in monitoring and control of system-level objectives. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
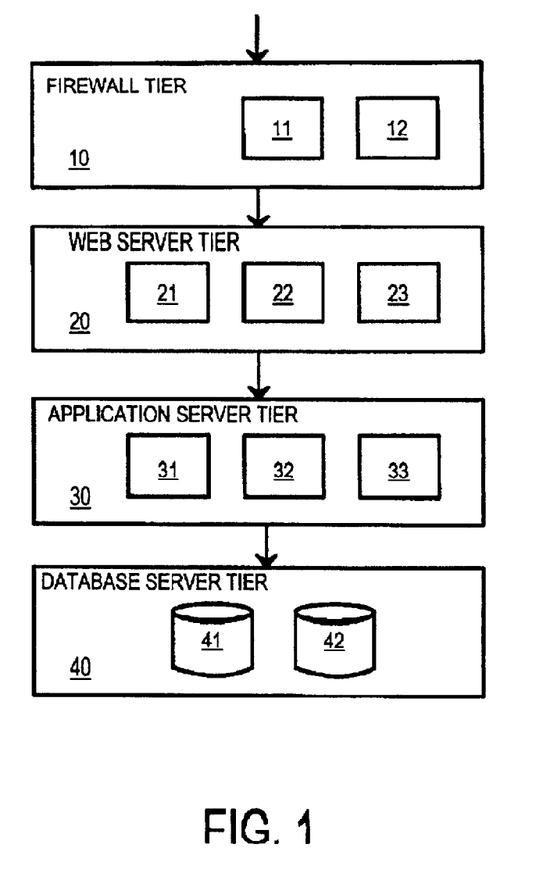
FIG. 1 is a diagram of a multi-tiered service model of an e-business web service.

Multi-Tiered Service Model—FIG. 1

A complex Internet web site may provide a variety of services to end users. An e-commerce site may provide product descriptions or catalog pages, an electronic shopping cart, and secure checkout and payment services. A government web site may provide information, secure payment of fees, database inquiries, message forwarding to government workers, and even web cam views promoting tourism. E-brokers provide stock quotes, account balances, and trading services. Several back-end databases may be accessed by front-end server applications. Each of these uses is known as a service. A single web site may provide many services.

These services are provided by a complex set of applications that may be distributed among several different computers networked together. Large web sites can have hundreds of server machines with clustered server and database applications. Incoming requests are assigned among these machines using load-balancing applications. Machines can be taken off-line for repairs, upgrades, or resetting while other machines continue to serve users, and machines can be added during heavy-traffic periods.

A service model that accounts for these various levels of applications and services is useful. Such a service model allows for better monitoring, diagnosis, and automated control of the various software components so that desired service-level objectives (SLO's) are met.

FIG. 1 is a diagram of a multi-tiered service model of an e-business web service. Four levels or tiers of service components are provided at the web site or server farm. Requests from users enter the web site at the top level, firewall tier 10. Several separate firewall devices 11, 12 may be used, perhaps with several separate physical connections to the Internet backbone or Internet Service Provider (ISP).

Requests that successfully pass through firewall tier 10 are served by one or more web servers 21, 22, 23 on web server tier 20. Web requests contained in Transport-Control-Protocol Internet Protocol (TCP/IP) packets are decoded by web servers 21, 22, 23, and the higher-level hyper-text transfer protocol (HTTP) messages and handshakes are acted on.

Application servers 31, 32, 33 on application tier 30 receive requests from web-server tier 20. In reply, web pages are assembled from various web pages and information stored in local storage. Response data from database queries are inserted into the assembled web pages, and forms are presented to the user to allow for user input.

When data from databases 41, 42 are needed to complete a web page to be sent back to a remote user, database tier 40 is accessed by application servers 31, 32, 33. The web pages themselves may be stored on local disks in application tier 30, or may be assembled almost entirely from data stored in database tier 40, or some combination used.

Several levels of software components are needed to provide the service to the user. In this example, each user request passes through a firewall component, a web-server component, an application component, and a database component. These components of the service on the different tiers are referred to as physical components or service components. Since these service components are often commercial software applications, they are sometimes referred to as application components or simply as applications, even when the application components are not on application tier 30. The service components work together to provide the overall service to the user.

The diagram of FIG. 1 shows just one service at a web site. Actual web sites have many services, each of which can be represented by its own service-model diagram like the one shown in FIG. 1. Each service can vary in the arrangement and type of tiers, as well as the number of nodes for each tier.

For example, a web site may provide the following services: stock quotes, weather data, and a video feed from a web camera. The service model for the stock-quote service may be as shown in FIG. 1, with the databases being a stock-price database. The weather-data service may replace the stock-price database with a city-temperature database. The web-camera service may replace the lower database tier with a video stream input server. Perhaps the firewall tier does not exist for the web-camera service.

Audio and video streaming services, security and authentication servers at various tiers can be added to the service models, as can a tier linking the service to financial-institution gateways. Actual e-business web sites often have many more instances of running applications and server machines than shown in the simplified example.

The tiered service model allows a system administrator to enumerate the many servers, applications, databases, security devices, and other components that provide services to remote web users. The tiered model organizes these components into functional levels or tiers that correspond to the data flow for each service. Statistics collected and events monitored can thus be organized by service and tier, allowing an automated management server to diagnose problems and relate them to service-level objectives.

The tiered model is especially useful for diagnosing availability problems. For example, when one server fails, such as application server 31, other application servers 32, 33 on that tier 30 can take over, keeping the overall service available. However, when all devices on one tier fail, such as when both databases 41, 42 fail, availability for an entire tier 40 fails. Even though other tiers may be running, the service becomes unavailable when one tier fails entirely. Using this tiered model, availability problems or performance bottlenecks can easily be identified and corrected by automated management processes.

Any element in a tier can perform the function of the tier's service component. For the web-server tier, assignment of an incoming request to a machine or element can be made by load balancing software. For the database tier, task assignment might be made by high-availability clustering software, which chooses the current active database server.

Figure 2:
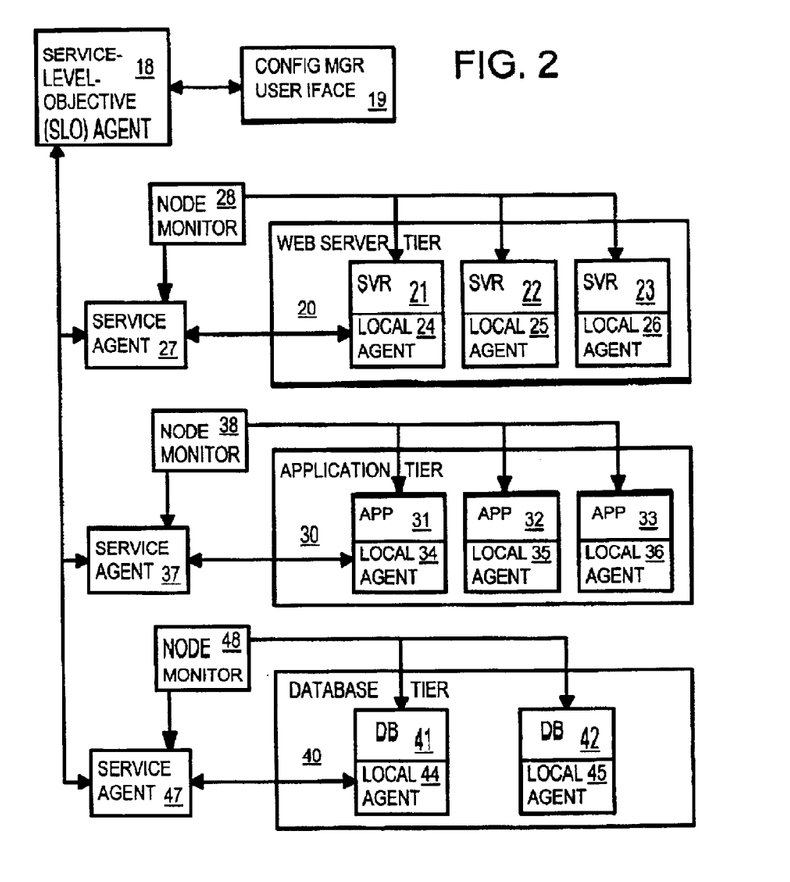
FIG. 2 is a diagram of a service-level-objective (SLO) monitoring and control system for a multi-tier web site.

FIG. 2 is a diagram of a service-level-objective (SLO) monitoring and control system for a multi-tier web site. In this greatly simplified diagram only three tiers 20, 30, 40 are shown, each with only a few web servers 21, 22, 23, application servers 21 32, 33, or databases 41, 42. Also, only one service is shown. Actual web sites can provide many services each with several more tiers in series or in parallel with the tiers shown, and each tier can have hundreds of servers or applications.

High-level service-level-objective (SLO) agent 18 communicates with an administrator/user through user-interface and configuration manager 19. The administrator defines the services and service-level objectives using configuration manager 19. These overall objectives are stored in SLO agent 18. When a service-level objective is not being met, the administrator is notified by an alarm message that SLO agent 18 sends to configuration manager 19.

Several mid-level agents are used in this embodiment. SLO agent 18 forwards service information to service agents 27, 37, 47. Although the overall service-level objectives are kept by SLO agent 18, service agents 27, 37, 47 keep track of service information and status for service components running on multiple systems controlled by these service agents 27, 37, 47.

The lower-level local agents are configured by service agents 27, 37, 47. In this embodiment each computer server machine has its own local agent running on it. Each local agent keeps information about service components running on its system. Each local agent monitors dependencies (other software modules) required by its services, and general system and service performance information, such as CPU, memory, and I/O channel usage.

Service agent 27 controls local agents 24, 25, 26, which control web servers 21, 22, 23, respectively on web-server tier 20. Node monitor 28 monitors the nodes for web servers 21, 22, 23, and can also monitor any sub-networks associated with these nodes. When an entire node fails, service agent 27 is notified by node monitor 28 even when the local agent is unable to communicate with service agent 27 due to the failed network connection or crashed server or hardware.

For example, when the node containing web server 22 fails, local agent 25 running on the same machine is unable to notify service agent 27. Instead, node monitor 28 notifies service agent 27 of the node's failure. Service agent 27 can then take corrective action, such as instructing a load balancer to stop sending requests to web server 22. The node can be automatically restarted and service-component software re-loaded by service agent 27, or if that fails, the administrator can be notified.

Other local agents 34, 35, 36 are similarly located on nodes running application servers 31, 32, 33, respectively. Service agent 37 is notified by node monitor 38 when any node on application tier 30 fails. Likewise, local agent 44 monitors and controls database 41, while local agent 45 monitors and controls database 42 on database tier 40. Node monitor 48 provides notification to service agent 47 should a node failure occur.

Figure 3:
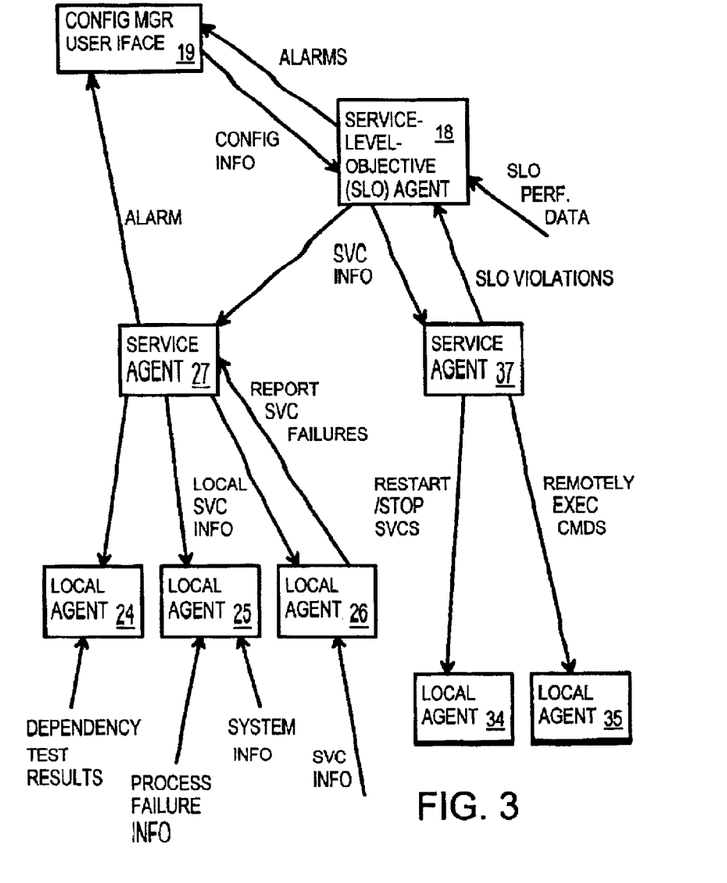
FIG. 3 highlights messages passed among agents for the SLO monitoring and control system.

Message Passing Among Agents—FIG. 3

FIG. 3 highlights messages passed among agents for the SLO monitoring and control system. Not all possible messages are shown; only a few messages are shown for illustrative purposes.

The administrator operates configuration manager 19, which sends service and SLO configuration information to SLO agent 18. This information is stored by SLO agent 18. A subset of this service information is sent from SLO agent 18 to service agents 27, 37, for service components under the control of those service agents. A still smaller subset of the service configuration is sent from the service agents to the local agents, such as from service agent 27 to local agents 24, 25, 26, Overall SLO performance data can be sent to SLO agent 18 by an SLO monitor. The SLO monitor may be an external service that measures response times, availability, and job duration from an external web site, or it may be a monitor within the local web site's network that reports directly to SLO agent 118. A variety of performance-monitoring tools can be used to acquire the SLO data.

Local agents 24, 25, 26 collect local status information, such as checking the status of dependent software used by a local service component, CPU, memory, and I/O usage, and status Information from configured services such as periodic usage statistics from the service components and operating systems (O/S). When a service component or dependent software process fails and is able to send a failure message, local agent 25 can receive the failure message. A wide variety of local statistics and status information can be collected, either directly from the O/S or service-component program, or using a variety of monitoring tools and software. The local agent monitors status information, checking that the service and its local components are running. The local agent also gathers periodic usage statistics, suck as resource usage.

Failures detected by local agents 24, 25, 26 are reported to service agent 27, which can send alarms to SLO agent 18. SLO violations detected by service agent 37 that cannot be fixed locally can be sent to SLO agent 18, which can adjust priorities for service components controlled by other service agents.

When a local failure occurs, such as a crashed application program on a server that is otherwise running, service agent 37 can automatically attempt to restart the crashed programs. Program stop and restart commands can be sent from service agent 37 to local agent 34. Remotely-executed scripts or commands can also be sent, such as from service agent 37 to local agent 35. These commands can be O/S commands to purge memory of an instance of the failed service-component program, and re-load and re-start the program.

Service agent 37 can attempt to resolve SLO violations for service components and systems under its control without assistance from SLO agent 18. Local agents 34, 35 can be instructed to adjust priorities among running processes to give a higher priority to a process for a service component that is not meeting its SLO. Additional instances of the service component may be installed and activated by service agent 37, either on machines already running the service, or on other machines under the control of service agent 37 that are idle or perhaps performing other operations or services.

However, if systems are shared between services, then more caution may be needed. Actions that might negatively affect other higher priority services are not taken by service agent 37. Instead, the SLO violation is reported to SLO agent 18. Since SLO agent 18 has information about all SLO's for all services, it can best decide how to re-adjust priorities or allocate services among the available machines to optimize the SLO's for the web site. Pre-configured policies can be used by SLO agent 18 to decide how to adjust service priorities when SLO violations occur. This adjustment according to the policies can be done automatically without intervention by the administrator.

Figure 4:
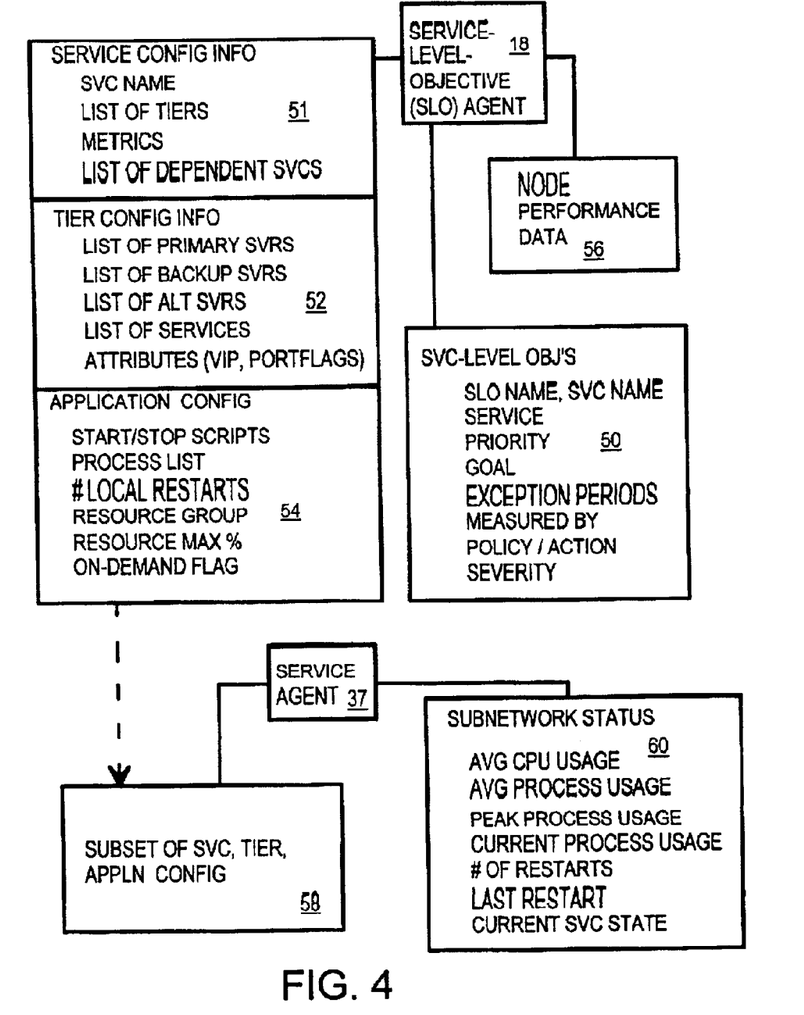
FIG. 4 is a diagram of service and SLO data kept by the SLO and service agents.

Configuration Data Kept by SLO and service agents—FIG. 4

FIG. 4 is a diagram of service and SLO data kept by the SLO and service agents. SLO agent 18 stores current performance data for all nodes it monitors in node performance area 56. When SLO agent 18 needs to increase performance of a service, it can search for less-utilized nodes (known as look-ahead) using node performance area 56. The nodes identified can be targets that the applications are replicated to when attempting to increase availability and performance of the service.

The user inputs configuration information such as SLO's which is stored in SLO storage 50. Service configurations are stored in service configurations 51, while the tiers that make up the service, and the resources available for each tier are loaded into tier configuration 52. Application loading and configuration information is stored in application configurations 54. Tier configuration 52 includes a backup list and an alternate-server list that are used in the look-ahead process. Other nodes are not considered since they aren't part of this tier's service.

A subset of service, tier, and application configurations 51, 52, 54 is copied to service-configuration subset 58 for service agent 37. Service-configuration subset 58 contains service, tier, and application configuration information for the service components controlled by service agent 37. Other service agents store other configurations.

Service agent 37 also stores subnetwork status 60 for nodes that run the service components controlled by service agent 37. Average and peak overall CPU usage (percentage), peak and current process (service) usage, and the current state of the service component can be stored in subnetwork status 60. The time of the last restart of each component or node, and the number of restart attempts can also be kept, either for each service component, or the node hardware.

Each service monitored at the web site has a configuration stored in service configurations 51. Each service record in service configurations 51 has a service name and an ordered list of tiers representing data flow to and from the service. This list of tiers corresponds to the service model of FIG. 1 for each service. Different services can have different arrangements and types of tiers. Standard performance and availability metrics can be stored for display to the administrator. A list of auxiliary service may be included. These auxiliary service are not in the data flow through the tiers of the service model, but are extra services used by the service, such as an external naming service.

The user/administrator can decide which metric to associate with an availability goal (SLO) for a service and which metric to associate with a performance goal (SLO). There may be other metrics that are interesting for viewing for this service, but that don't map directly to service levels. The administrator can subscribe for these metrics and associate them with the service.

Tier configuration 52 contains a list of servers for each tier, and a list of service components (software applications) for that tier. Thus tier configuration 52 associates service components with server machines or nodes on a tier basis. Each tier's record contains a list or primary servers and backup servers that can be used when the primary servers fail or are insufficient to meet the SLO's. The alternate servers can be used as additional backup servers, but are less efficient, slower, or otherwise provide a lower-quality of service.

Application configurations 54 contains more detail for each service component or application program. Each service component can have a list of dependent services or software components that must be running for the application to be functional. Attributes such as a subnetwork, IP address, port, and protocol information can be included for network services. This is useful for monitoring the service. A list of tests can be included to monitor the services. Flags can be included, such as a flag to indicate that the service can be replicated or not.

Start and stop scripts can be stored for each application. These scripts can be executed by the service agent. The process list is a list of processes that should be running for each instance of that application. The number of local restarts is a limit to the number of times that an application restart can be attempted before giving up and trying other recovery actions. The resource cap is a maximum resource allocation for the application, which can default to 100%. This cap is an upper limit to the automated adjustment of priorities by the SLO or service agents. Specific resource allocations may not always be controllable since they may need a system resource manager. A system resource manager references the service by its resource group.

The on-demand flag indicates that the application is activated in response to requests, rather than always running, even while waiting idle. Other information such as the location of the software to install, user names and passwords, and authentication information can be included in application configurations 54.

Once the administrator has defined a service, and the configuration is loaded into service configurations 51, objectives for that service can be defined. These SLO's are stored in SLO storage 50 for each configured service. The name or label of that service is stored in its record, along with objective. For example, the SLO response time could be associated with the stock quotes service. Another SLO, availability could also be associated with the stock quotes service. The service-level objective's priority relative to other SLO's allows the SLO agent to adjust resource allocation according to these priorities.

The goal is the target for the SLO, such as the metric response time <5 sec 80% of the time. Exception periods such as scheduled maintenance times can be defined. The software tools or programs used to measure the SLO to compare to the goal can also be stored. For example, an external monitor may measure response times, while the SLO agent can monitor availability by measuring the availability of servers on each of the tiers used by the service.

Policies can be defined or referenced for the service objective. A policy defines how the SLO agent should respond to a SLO violation, or how the service agent should respond to an alarm, such as a node failure. Actions can include fail-over or restarting failed applications, replicating the application to additional nodes, adjusting resource allocations, or changing load-balancing weights. Severity indicates the importance of a violation of this SLO, which can be used to determine when to send an alarm to the administrator.

In the preferred embodiment, policies are essentially a toolkit of available repair actions that the administrator can choose from to build an overall recovery policy for the service. An example list of policies might be:

Replicate, Stop-lower-priority, Activate-alternate.

If this SLO is not being met, the control engine may first try to replicate the service to improve service quality. If this doesn't help, the control engine may stop lower priority services that are sharing resources, and if this doesn't help, an alternate server may be activated. The control engine may also report when it is out of policies to try.

Figure 5:
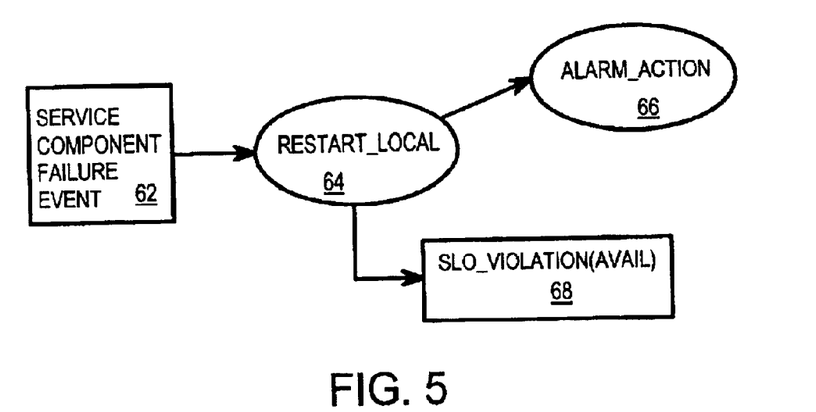
FIG. 5 is a software entity diagram showing policy actions called in response to a service-component failure.

FIG. 5 is a software entity diagram showing policy actions called in response to a service-component failure. Service-component failure event 62 is generated by a local agent and sent to its service agent when a running process of a service component or application fails, or when a dependent service needed by the service component fails.

The ability to monitor the availability of processes making up a service component is a built-in capability of the local agent. The local agent can also periodically check that pre-configured dependencies are being met. For example, a service component may be dependent on the existence of a specific file. If that file goes away, the dependency test fails. In addition to file-existence tests, a sub-network availability test is another common dependency check. Restarting after a dependency failure may not fix the component (unless the start script also is capable of starting dependent components), but the restart limit will quickly be exhausted and another policy may then apply, such as restarting the service component on an alternate server. Service-component failure event 62 can also be generated when the service component's dependency test fails.

When the service agent receives service-component failure event 62 from a local agent, it activates restart-local routine 64. Restart-local routine 64 causes a message to be sent from the service agent to the local agent, instructing the local agent to stop and restart the service-component process and any dependent processes. Restart-local routine 64 is shown in more detail in FIG. 9.

The service agent then activates alarm action routine 66 to send an alarm message to the SLO agent. The alarm message is not sent when the alarm severity is configured to not send the alarm. The alarm message tells the SLO agent what action (restart local service component) the service agent is taking.

When the maximum number of restarts allowed by the configuration is reached, SLO violation-availability event 68 is activated. This event 68 indicates that the availability objective may fail because a service component has failed to restart after several attempts. The service agent can then attempt to increase availability by starting other instances of the failed service component on other nodes. The SLO agent can be notified if the service agent is unable to correct the problem by itself. In some cases the system may just report a minor alarm (degraded capacity) with no further action. The degraded capacity may lead to an SLO-perf violation, or another failure may lead to an SLO-avail violation.

Figure 6:
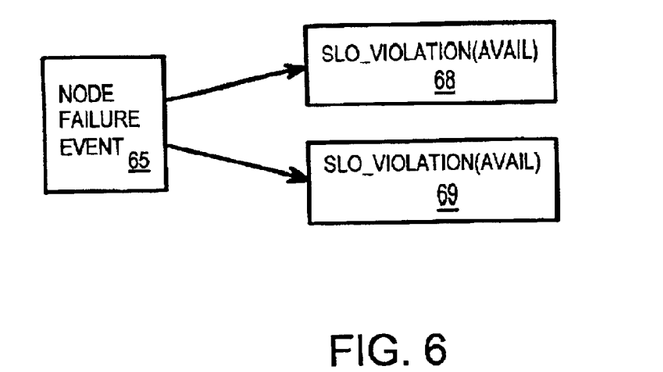
FIG. 6 is a software entity diagram showing policy actions called in response to a node failure.

FIG. 6 is a software entity diagram showing policy actions called in response to a node failure. Node failure event 65 is generated by the service agent or the node monitor when a node on the local network fails to operate properly. For example, the node monitor can periodically ping each node. If a node fails to reply to several pings, it may be down. The node monitor can then inform the service agent of the node's failure to respond. Other node monitoring methods can be used. For example, in the preferred embodiment local agents are in regular communication with a central management station and can thus provide implicit heartbeats. A node monitor is needed to ping only those nodes that don't have a local agent, such as hardware switches.

When node failure event 65 is generated, the service agent generates SLO violation-availability event 68 for each service component running on that node. For example, when a machine fails for the node running both a web server and an application, two SLO violation-availability events 68, 69 are generated, one for the web-server component, and the other for the application component. The service agent can then attempt to resolve the availability problem by replicating more instances of the web-server and application components on other nodes.

Figure 7:
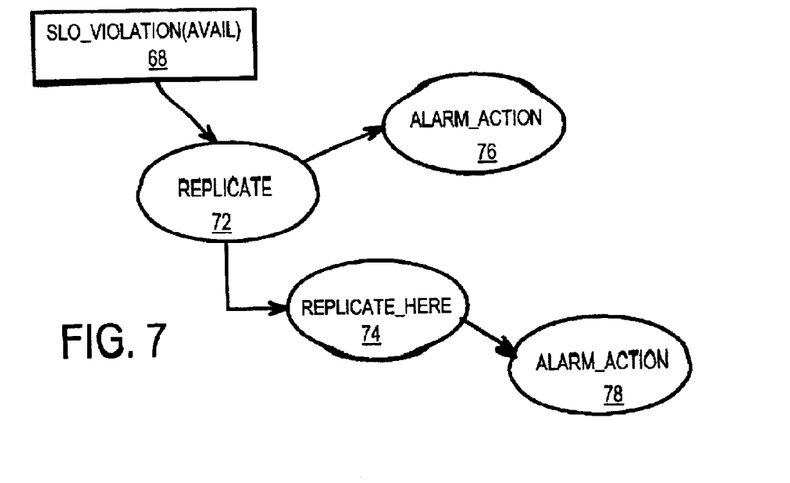
FIG. 7 is a software entity diagram showing policy actions called in response to an availability service-level-objective violation.

FIG. 7 is a software entity diagram showing policy actions called in response to an availability service-level-objective violation. SLO violation events can be generated by the service agent or by the SLO agent based on performance data received by an external service monitor. The SLO violations are handled according to the order of their configured SLO priorities.

SLO violation-availability event 68 causes the service agent or SLO agent to activate replicate routine 72. The service agent can do the replication if there are no resources shared with other services; otherwise the action is delegated to the SLO agent. The replicatable flag in the service's configuration is examined. If the service component is not replicatable, alarm action 76 is called, sending an alarm message to the SLO agent.

To execute the replicate policy, a look-ahead search of other nodes is preformed to find a target node. The other primary servers are searched, and then the backup servers from the tier's configuration. When one of these servers has enough capacity to accommodate the expected load for the server component, that node is chosen as the target node. The target node's address or other identifier is sent to the replicate-here routine 74 that is called.

Replicate-here routine 74 executes the service component's start script on the target node. This start script causes an instance of the service component to be loaded and started on the target node. Any dependent processes needed on the target node are also initiated. Alarm action 78 is then called to tell the SLO agent of the action taken.

Figure 8:
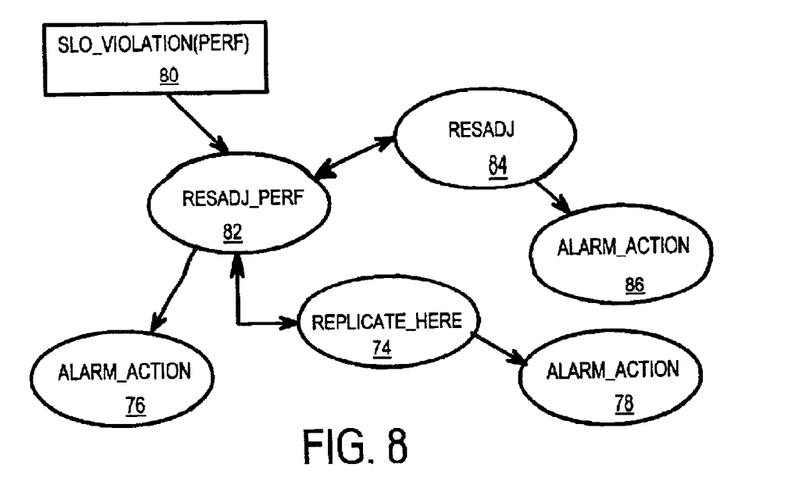
FIG. 8 is a software entity diagram showing policy actions called in response to a performance service-level-objective violation.

FIG. 8 is a software entity diagram showing policy actions called in response to a performance service-level-objective violation. SLO violation-performance event 80 is generated by the SLO agent when the external monitor detects that one of the performance objectives is failing. Performance objectives can fail even when availability is sufficient, such as when only one server on a tier is operating, causing a performance bottleneck.

SLO violation-performance event 80 causes resource-adjust-performance routine 82 to be called. Resource-adjust subroutine 84 is called which uses a local resource manager (if available) to increase the resources available to the failing service component. The resource limit or cap for the service limits the maximum resources that can be assigned to the service component. Resources can be taken from service components for a lower-priority service objective and the effects observed over time. When such a resource adjustment is made, alarm action 86 can be called to report the action taken and the result.

When no resource adjustment could be made by resource-adjust subroutine 84, a look-ahead search can be performed to find other nodes with available resources that are not yet running the failing service component. If such an available node is found, replicate-here routine 74 is called with the available node as the target. The service may not be replicated if it could negatively impact a higher-priority service already running on that node. The failing service component is then copied to the target node, installed, and started by replicate-here routine 74. Alarm action 78 is called to notify the SLO agent of the action taken.

Figure 10:
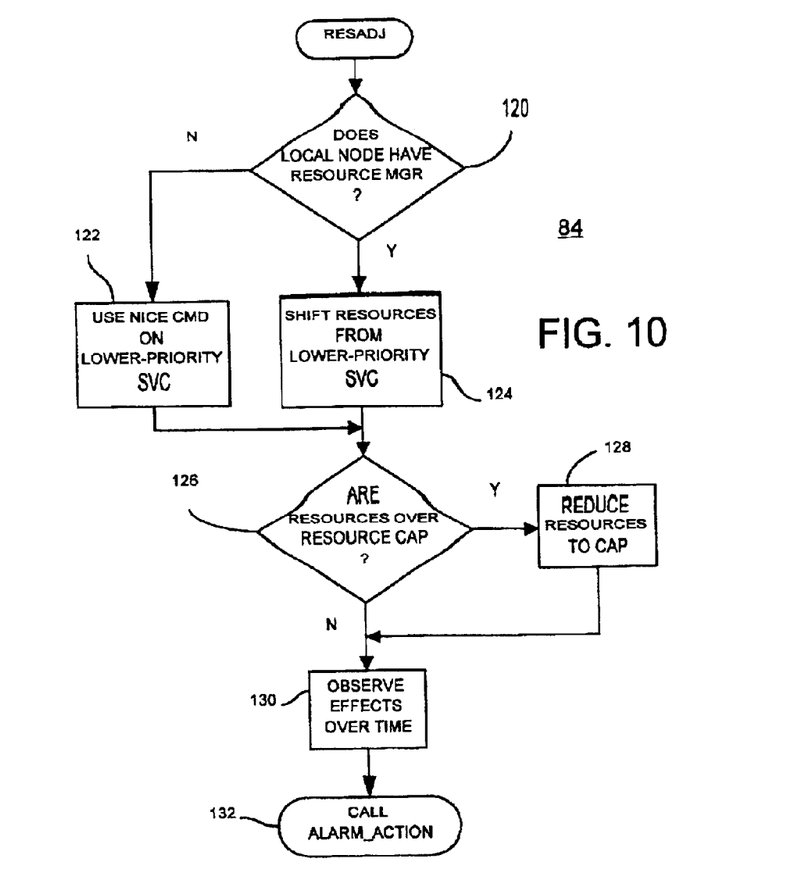
FIG. 10 is a flowchart of the resource-adjust subroutine.
Figure 11:
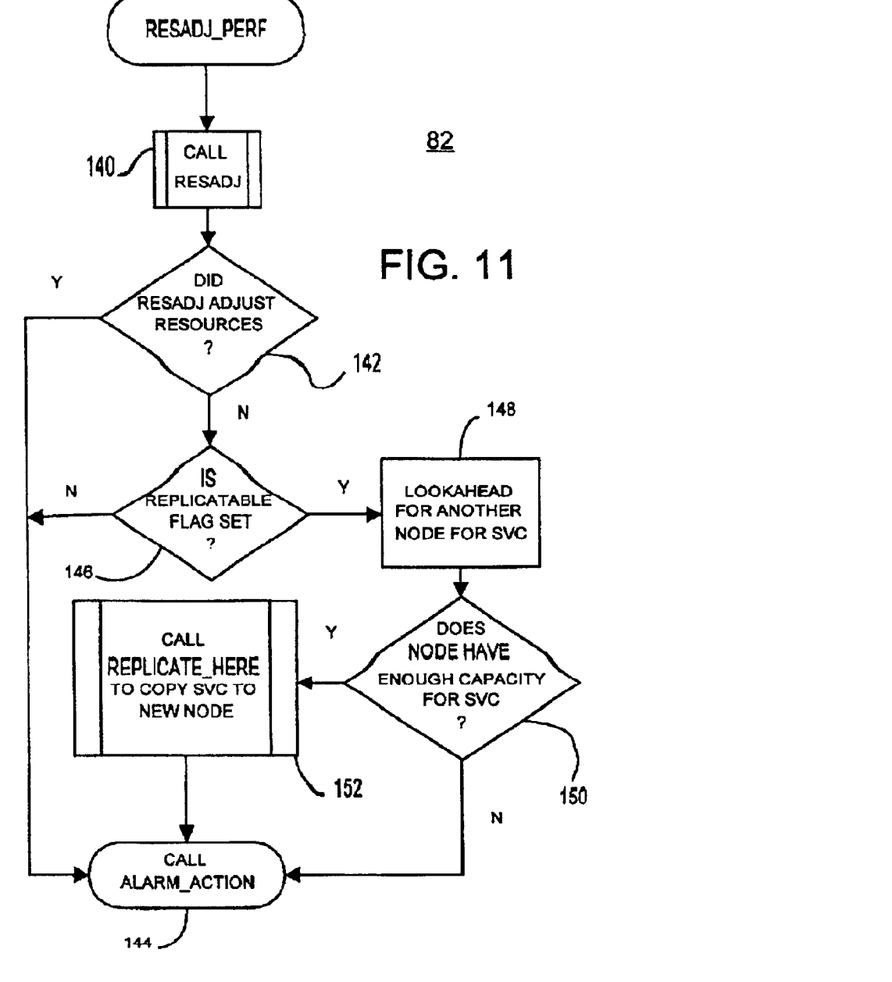
FIG. 11 is a flowchart of the resource-adjust-performance routine.

When no available node is found by the look-ahead search, alarm action 76 is called. The SLO agent is notified that no action could be taken. FIGS. 10 and 11 show resource-adjust-performance routine 82 and resource-adjust subroutine 84 in more detail. These routines can be executed by the SLO agent Resources can be adjusted between multiple services, which may have differing priorities.

Figure 9:
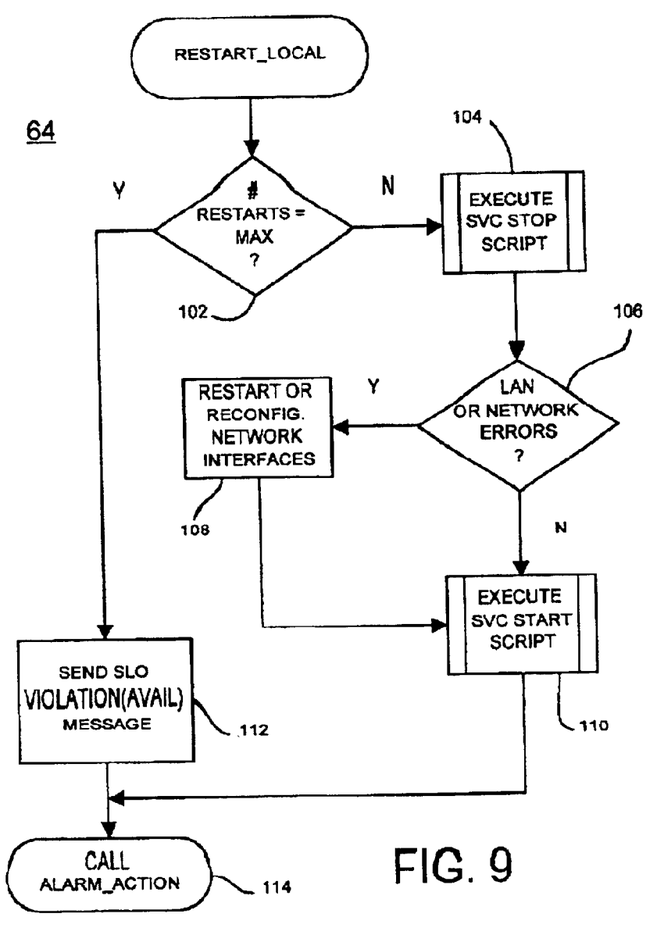
FIG. 9 is a flowchart of the restart-local routine.

FIG. 9 is a flowchart of the restart-local routine. Restart-local routine 64 is used by the service agent to restart a failed service component or application using the local agent. The number of restarts for this service component is compared to the maximum number of allowed restarts, step 102. When the number of restarts has exceeded the maximum, then an alarm message is sent to the service agent to indicate that there has been a service-component failure. If the service is still available, then no further actions may be taken. Otherwise, if the service agent can activate a backup (because it isn't sharing resources with another service) it may do that, otherwise the SLO agent can be notified.

When the maximum number of restarts has not been exceeded, step 102, then the stop script is executed on the node running the failed service Component, step 104. If any local-area network (LAN) or other network failures are detected, step 106, then the network interfaces can be reset and restarted, step 108. The start script for the failed service component is then executed on the node, step 110. The SLO agent is notified of the restart action taken, step 114.

FIG. 10 is a flowchart of the resource-adjust subroutine. Resource-adjust subroutine 84 is called to adjust resources on a node running a service component that is causing the service to not meet its performance objective.

The local node running the performance-failing service component is checked in step 120 to see if it has a local resource manager, such as a third-party resource-manager tool. If no such resource manager is available, an O/S command or script might be able to be executed on the node to adjust the resource allocation. For example, the UNIX nice command can be executed for other lower-priority processes running on the node to give a higher priority to the failing service component, step 122.

When the local resource manager is present, it can be used to shift resources from lower-priority processes to the failing service component, step 124. A message can be sent from the SLO agent to the service agent and then to the local agent and to the resource manager running on the node to command the resource shift. Resource-allocation targets such as CPU or main memory allocation can usually be specified.

The new resource allocation is compared to the resource cap for the failing service component, step 126. If the resource cap is exceeded, the resource allocation to the failing service can be reduced to below the cap, step 128.

The effects of the change in resource allocation is observed over time, step 130. These effects can be reported to the service agent and the SLO agent along with the action taken using the alarm-action event, step 132. Further adjustments can then be made.

FIG. 11 is a flowchart of the resource-adjust-performance routine. Resource-adjust-performance routine 82 is called by SLO violation-performance event 80 when a performance SLO is not being met.

Resource-adjust subroutine 84 is called, step 140. If Resource-adjust subroutine 84 was able to adjust the local resources on the node with the failing service component, step 142, then the alarm-action routine can be called to tell the SLO agent what action was taken, step 144. Otherwise, no resource adjustment was made. The replicatable flag for the service component is checked, step 146. When the flag indicates that the service component cannot be replicated to other servers, alarm-action tells the SLO agent of the failure to find an action to take, step 144.

When the replicatable flag indicates that the service component can be replicated, step 146, then a look-ahead search for another node to host the service component is performed, step 148. If a node is found with enough spare capacity to host another running instance of the service component, step 150, then replicate-here routine 74 is called, step 152. The start script is executed on the target node to copy and initialize another copy of the service component. This improves performance since another server is added to perform the failing service component on that tier.

When no suitable node is found in the look-ahead search, step 150, then alarm-action is called to notify the SLO agent of the failure to find an action to take, step 144.

Figure 12:
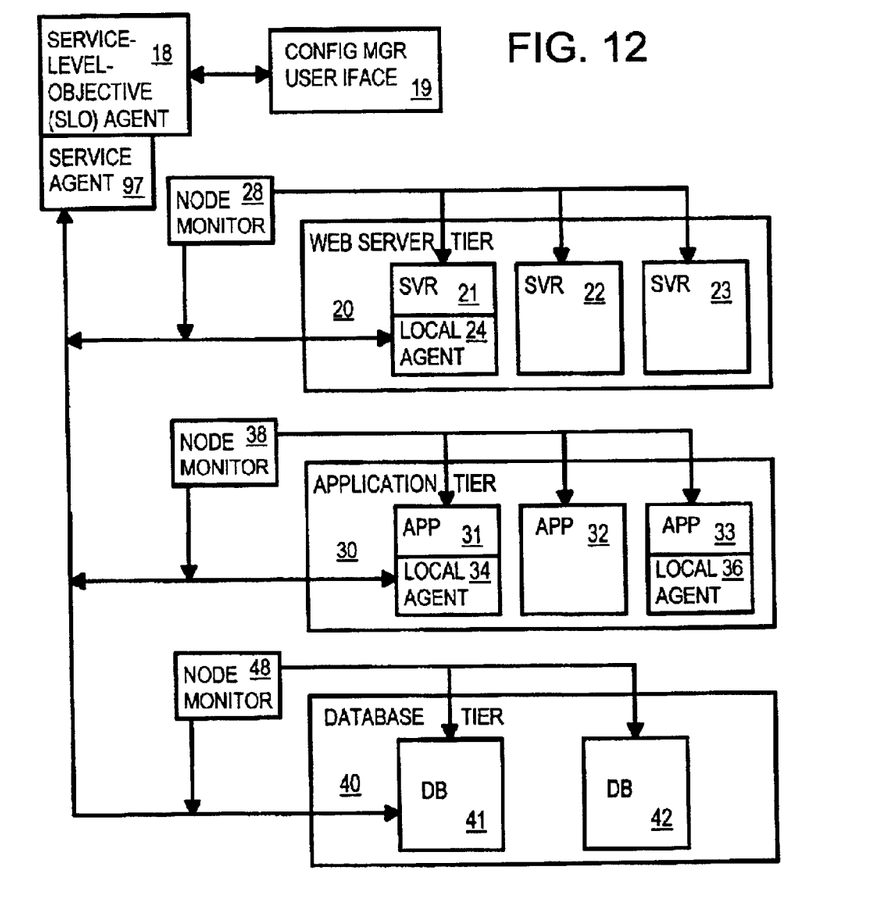
FIG. 12 is an alternate embodiment of the multi-tiered SLO monitoring and control engine.

FIG. 12 is an alternate embodiment of the multi-tiered SLO monitoring and control engine. Rather than have many service agents dispersed among the tiers and servers, a single service agent 97 is used for all tiers. This single service agent 97 still receives configuration information from SLO agent 18, and sends local configuration information to local agents 24, 24, 36.

Node monitors 28, 38, 48 all report to service agent 97, rather than to separate service agents. Thus service agent 97 is responsible for monitoring al nodes for the service.

Some servers 22, 23, application server 32, and databases 41, 42 do not have local agents running on their nodes. Local policies such as a resource adjustment may not be able to be performed on those nodes. The control engine can skip the action steps and go directly to alarming or trying subsequent policies. Some policies such as a load-balancing weight adjustment may impact a service component without requiring a local agent on that component.

Some nodes or computers may run several service components, even components from different levels. For example, application server 33 and database 42 may be running on the same machine with web-server 22. Local agent 36 can control all three service components and the common hardware node.

Alternate Embodiments

Several other embodiments are contemplated by the inventors. The same computer machine may run software components for several different tiers. For example, one PC could run a web-server application and a database application, and could even contain the database itself. Service agents that control these software components could be allowed to vary resource allocation among software components on one tier, but when re-allocation is desired among different tiers, the SLO agent is used.

Custom policies can be added that combine the action routines in other sequences, or that use other procedures such as fail-over routines. Premium or differentiated services can be provided using different service models and different SLO'S.

A wide variety of policies are available. It should be possible to interact with load balancers, network packet shapers, cluster fail-over solutions, etc. to take actions that may improve service quality. The policies are unique in their ability to take the service priority into account as part of the action (e.g. lower the load balancing weight of server A in order to help service A, as long as it doesn't negatively impact service B which is a higher priority). These sophisticated policies are not possible without a service model and prioritized SLO's.

Cascading failures can be avoided by early detection and correction of availability problems and performance bottlenecks within one tier before they cause failures on other tiers. Some manual control can be allowed, such as the administrator being sent an alarm and a list of suggested actions to select from. Once selected, the actions can automatically be taken by the management server.

The control system does not require the ability to have full monitoring and control over all service component types. For example, it may not be possible to externally adjust the load balancing being done at the application server tier. In these cases, the control system can either try another policy or just send an alarm if no other policies are available. The SLO configuration indicates how and where the data is being collected. Any collection tool can be used, although the data is preferably sent in a common format.

In the preferred embodiment, the user explicitly defines policies to be used when the SLO is in violation. Policies are an ordered list. A semi-implicit policy is that service components that fail will be automatically restarted based on a restart limit.

In an alternate embodiment, the control engine can take automatic actions (restart, replicate, etc.) implicitly based on a 'level of disruption'. The control engine can try more and more drastic actions. In this embodiment the replicatable flag can be used to tell the control engine that replication is an available control mechanism for this service.

A policy that is an alternate to replicating a service is a policy to activate an alternate. Instead of using the backup list, this alternative uses the alternate list. This is a separate policy from the replicate policy because it has a more negative effect on the service: the service quality is likely to drop.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. §1.72(b). Any advantages and benefits described may not apply to all embodiments of the invention. When the word 'means' is recited in a claim element, Applicant intends for the claim element to fall under 35 USC §112, paragraph 6. Often a label of one or more words precedes the word 'means'. The word or words preceding the word 'means' is a label intended to ease referencing of claims elements and is not intended to convey a structural limitation. Such means-plus-function claims are intended to cover not only the structures described herein for performing the function and their structural equivalents, but also equivalent structures. For example although a nail and a screw have different structures, they are equivalent structures since they both perform the function of fastening. Claims that do not use the word means are not intended to fall under 35 USC §112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A distributed monitor and control engine comprising: a service-level-objective (SLO) agent, receiving measurements of an SLO objective for a web service to a web user, the measurements of the SLO objective indicating service quality for the web user accessing the web service at a web site, the SLO agent for adjusting resources at the web site to improve the measurements of the SLO objective;

a service agent, coupled to the SLO agent, for monitoring and controlling one or more tiers at the web site, wherein a request from the web user passes through a plurality of tiers, each tier having a plurality of service components each capable of performing a tier service for the request, the request being processed by performing a series of tier services of different tiers; and local agents, running on nodes containing the service components, each local agent for monitoring status of a service component and for adjusting local computing resources available to the service component in response to commands from the service agent, each local agent reporting status to the service agent, wherein the SLO agent uses the service agent and local agents to adjust resources at the web site to improve measurements of the SLO objective.

2. The distributed monitor and control engine of claim 1 wherein an availability SLO fails when all service components fail on any one of the plurality of tiers, the web service becoming unavailable when one tier of the plurality of tiers has no available service components for performing the tier service;

wherein the SLO agent instructs the service agent to replicate a service component for a failing tier to another node in response to the availability SLO failing, whereby service components for the failing tier are replicated to improve the availability SLO.

3. The distributed monitor and control engine of claim 2 wherein when a performance SLO fails, the SLO agent sends a message to the service agent, the service agent instructs one or more local agents to increase local computing resources, or the service agent replicates a service component to increase performance.

4. The distributed monitor and control engine of claim 3 further comprising:

node monitors, coupled to report to the service agent when a node containing a service component fails, whereby nodes are monitored by the node monitors and by the local agents.

5. The distributed monitor and control engine of claim 2 wherein the plurality of tiers comprises at least three of the following tiers: a firewall tier, a web-server tier, an application-server tier, and a database-server tier, wherein service components for the web-server tier comprise web servers, wherein service components for the application-server tier comprise web applications, and wherein service components for the database-server tier comprise database servers.

6. The distributed monitor and control engine of claim 2 further comprising:

a configuration manager with a user interface to an administrative user for the web site, the configuration manager receiving tier-configuration, service-configuration, and SLO information from the administrative user;

configuration storage, coupled to the SLO agent, for storing the tier-configuration, service-configuration, and SLO information from the configuration manager;

wherein the SLO agent compares a goal in the SLO information to the measurements of the SLO objective received to determine when to adjust resources at the web site to improve the measurements of the SLO objective.

7. The distributed monitor and control engine of claim 6 wherein the tier-configuration information includes a list or primary servers and a list of backup servers for running the service component for the tier service;

wherein the service-configuration information includes a list of tiers performing tier services for the service to the web user;

wherein the SLO information includes a name of a service for the SLO, a goal, and an action to execute when the goal is not met.

8. The distributed monitor and control engine of claim 7 wherein the service agent stores a subset of the tier-configuration, service-configuration, and SLO information stored by the configuration storage for the SLO agent, the subset being for tiers controlled by the service agent.

9. The distributed monitor and control engine of claim 8 wherein the service agent comprises a plurality of service agents distributed about the web site, each service agent for monitoring and controlling a different tier at the web site, each service agent coupled to local agents for one tier.

10. A computer-implemented method for monitoring and controlling a web site to meet a service-level objective (SLO) of a service having multiple tiers of service components, the method comprising:

when a SLO agent determines that an availability SLO is not being met:

commanding a service agent for a failing tier to replicate a service component for the failing tier that is below a tier-performance baseline and causing the SLO to not be met to increase a number of service components for the failing tier; and sending an alarm from the service agent to the SLO agent indicating an action taken;

when a SLO agent determines that a performance SLO is not being met:

sending a message from the SLO agent to a service agent for a low-performing tier;

sending a command from the service agent to a local agent running a service component for the low-performing tier;

the local agent attempting to shift resources to the service component for the low-performing tier from lower-priority services running on a local node controlled by the local agent;

when the local agent is not able to shift resources, replicating the service component to a target node to increase a number of service components for the low-performing tier; and sending an alarm signal from the service agent to the SLO agent to report an action taken, whereby availability and performance SLO violations are acted on by the SLO agent instructing the service and local agents to shift resources or replicate service components of a tier causing the violation.

11. The computer-implemented method of claim 10 wherein replicating the service component comprises:

searching for a target node with sufficient resources to execute the service component;

replicating the service component to the target node.

12. The computer-implemented method of claim 11 further comprising:

when the local agent is coupled to a local resource manager and the performance SLO is not being met, using the local resource manager to shift resources to the service component from lower-priority services running on a local node controlled by the local resource manager and the local agent.

13. The computer-implemented method of claim 12 when a local agent signals to the service agent that a service component has failed:

the service agent comparing a maximum number of allowed restarts in a configuration to a current number of restarts for the service component;

when the current number of restarts exceeds the maximum number of allowed restarts, sending a message from the service agent to the SLO agent indicating a SLO availability violation;

when the current number of restarts does not exceed the maximum number, the service agent causing the local agent to execute a stop script to stop execution of the service component and a start script to re-initiate execution of the service component.

14. The computer-implemented method of claim 13 further comprising:

when network errors are detected when restarting a service component, restarting or reconfiguring network interfaces coupled to the service agent before executing the start script to re-initiate the service component.

15. The computer-implemented method of claim 14 when a node monitor signals to the service agent that a network node is no longer accessible, the service agent sending a message to the SLO agent indicating a SLO availability violation for each service component that was running on the network node that is no longer accessible.

16. A computer-program product comprising:

a computer-usable medium having computer-readable program code means embodied therein for controlling and monitoring service-level objectives, the computer-readable program code means in the computer-program product comprising:

network connection means for transmitting and receiving external requests for a service;

first tier means for receiving and partially processing external requests for the service having a service-level objective (SLO), the first tier means having a plurality of first service components each able to partially process a request when other first service components are not operational;

second tier means for receiving and partially processing requests from the first tier means, the second tier means having a plurality of second service components each able to partially process a request when other second service components are not operational;

third tier means for receiving and partially processing requests from the second tier means, the third tier means having a plurality of third service components each able to partially process a request when other third service components are not operational;

first local agent means, running on nodes for running the first service components, for monitoring and controlling the first service components of the first tier means;

second local agent means, running on nodes for running the second service components, for monitoring and controlling the second service components of the second tier means;

third local agent means, running on nodes for running the third service components, for monitoring and controlling the third service components of the third tier means;

SLO agent means, coupled to receive SLO measurements, for comparing an SLO measurement to a goal for a service and signaling a SLO violation when the goal is not met by the SLO measurement;

first service agent means, coupled to the first local agent means, for instructing the first local agent means to adjust resources to increase performance of the first service components in response to a message from the SLO agent means signaling the SLO violation when the SLO violation is caused by the first service components of the first tier means;

second service agent means, coupled to the second local agent means, for instructing the second local agent means to adjust resources to increase performance of the second service components in response to a message from the SLO agent means signaling the SLO violation when the SLO violation is caused by the second service components of the second tier means; and third service agent means, coupled to the third local agent means, for instructing the third local agent means to adjust resources to increase performance of the third service components in response to a message from the SLO agent means signaling the SLO violation when the SLO violation is caused by the third service components of the third tier means, whereby multiple tiers of service components are controlled.

17. The computer-program product of claim 16 wherein:

the first service agent means is also for replicating the first service component to other nodes in response to the SLO violation to increase availability and performance of the first service components of the first tier means;

the second service agent means is also for replicating the second service component to other nodes in response to the SLO violation to increase availability and performance of the second service components of the second tier means;

the third service agent means is also for replicating the third service component to other nodes in response to the SLO violation to increase availability and performance of the third service components of the third tier means.

18. The computer-program product of claim 16 wherein the computer-readable program code means further comprises:

restart means, in the first, second, and third service agent means, for instructing the first, second, or third local agent means to execute a re-start script to re-start the service component.

19. The computer-program product of claim 16 wherein the computer-readable program code means further comprises:

compare means, coupled to the restart means, for limiting a number of times restart is attempted for a node, the first, second, or third service agent means signaling the SLO agent means when restart exceeds a limited number of times.

20. The computer-program product of claim 16 wherein the first tier means comprises a web-server tier and the first service components are web-server components;

wherein the second tier means comprises an application-server tier and the second service components are applications;

wherein the third tier means comprises a database-server tier and the third service components are database-accessing servers.

* * * * *